United States Patent [19]

Nudelman et al.

[11] 4,148,620
[45] Apr. 10, 1979

[54] DEVICE INCLUDING OPPOSED FAN PAIRS PRECIPITATING CHLORINE-CONTAINING COMPOUNDS FROM WASTE GASES

[75] Inventors: Boris I. Nudelman; Vitaly I. Lisbaron; Vyacheslav P. Kortnev; Valentina P. Sharova; Vakel K. Imangulov; Anatoly I. Afanasiev, all of Tashkent, U.S.S.R.

[73] Assignee: Tashkentsky Nauchno-Issledovatelsky i Proektny Institut Stroitelnykh Materialov "Niistromproekt", U.S.S.R.

[21] Appl. No.: 811,388

[22] Filed: Jun. 29, 1977

[30] Foreign Application Priority Data

Nov. 16, 1976 [SU] U.S.S.R. .......................... 2417339[I]

[51] Int. Cl.² .............................................. B01D 45/00
[52] U.S. Cl. .......................................... 55/403; 55/71; 55/470

[58] Field of Search .................. 55/71, 470, 401–403; 23/313, 314; 259/6; 209/138, 139

[56] References Cited

U.S. PATENT DOCUMENTS

| | | | |
|---|---|---|---|
| 1,585,358 | 5/1926 | Arkwright | 55/470 |
| 2,588,138 | 3/1952 | McBurney | 55/403 |
| 2,688,376 | 9/1974 | Gilliam | 55/233 |
| 3,410,054 | 11/1968 | Deilers | 55/71 |

Primary Examiner—Bernard Nozick
Attorney, Agent, or Firm—Robert E. Burns; Emmanuel J. Lobato; Bruce L. Adams

[57] ABSTRACT

A device for recovery of chlorine-containing compounds from waste gases having a chamber for passage of waste gases, including an inlet and outlet pipes and fans arranged in pairs inside the chamber along the gas flow, one opposite another, their blades being arranged parallel to the flow of waste gases through the chamber.

6 Claims, 1 Drawing Figure

U.S. Patent
Apr. 10, 1979
4,148,620
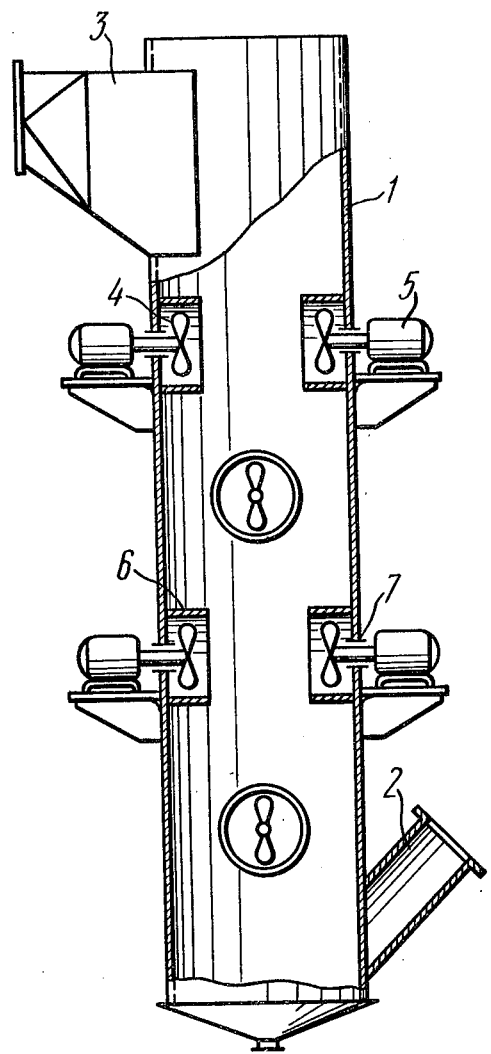

DEVICE INCLUDING OPPOSED FAN PAIRS PRECIPITATING CHLORINE-CONTAINING COMPOUNDS FROM WASTE GASES

BACKGROUND OF THE INVENTION

The present invention relates to such devices as scrubbers, gas conduits, dust chambers and the like, in which chlorine-containing compounds are recovered by a dry process.

The invention can advantageously be used in all industries using such devices (metallurgical, chemical, construction materials).

An agitator for plastics, is known in art and a number of drive shafts with paddles intended for mixing the product, arranged along the agitator's perimeter and passing through its side wall on the level of the upper surface of the product being mixed. The paddles are set at a certain angle relative to one another. The agitator is used for producing chemicals and pharmaceuticals.

A disadvantage of this agitator is that such an arrangement of the paddles inside the working chamber, passing therethrough is a suspension of solid matter in waste gases, results in chaotic agitation of the flow without any increase in the time and speed of recovery.

Also known is a mass-exchange apparatus for conducting microbiological processes in the presence of oxygen, comprising a housing separated by perforated partitions into sections, each section is provided with a ring barometer and a stirrer arranged thereabove to enhance the efficiency of the apparatus. The stirrers are provided with submersible motors and arranged tangentially to the apparatus cross-section.

A drawback of the above mass-exchange apparatus resides in that the tangential arrangement of the motors with stirrers causes but slight agitation of the exhaust gases without any recovery of chlorine-containing compounds.

SUMMARY OF THE INVENTION

It is an object of the present invention to provide a device for intensifying the processes of dry recovery of chlorine-containing compounds.

Another object of the invention is to provide a device ensuring maximum recovery of chlorine-containing compounds.

Still another object of the invention is to provide for an optimum arrangement of fans inside a working chamber of the device.

These and other objects are attained in a device for recovery of chlorine-containing compounds from waste gases, comprising a chamber for passage of waste gases, including an inlet and outlet pipes and fans. According to the invention, the fans are arranged in pairs along the gas flow path, one opposite another, and their blades are arranged parallel to the flow of waste gases through the chamber.

The fan blades should preferably be accommodated in special housings serving as guides for the stream created by the blades in a direction normal to the waste gas flow.

The distance between the blades of each pair of fans may be equal to 1–8R where R is the length of a fan blade. Such an embodiment of the device will permit intensifying the process of recovery of chlorine-containing compounds.

The present invention resides in the following:

In the device, fans are arranged opposite one another at a distance of 1 to 8R (R being the length of a fan blade) and create a turbulent gas flow, thereby permitting hydrodynamic deceleration of two coaxial streams of suspended particles in gas, having a certain velocity (at least 10 m/s). At convergence points, solid particles are transferred from one stream to the other, decelerated, accelerated in the opposite direction, and return to the original stream. Having undergone a number of such oscillations, the particles enter the area of capture by a next pair of fans.

Intensification of the process is due to the increasing velocities, inertial effects and flow agitation, as a result of which the time of residence of particles in the active zone of the device increases.

The distance between fans, vertically and along the perimeter, is determined by the size of a device intended for recovery of chlorine-containing compounds, and must provide for the required degree of turbulence of the flow through the device, hence, the required degree of recovery of chlorine-containing compounds.

BRIEF DESCRIPTION OF THE DRAWING

The invention will be better understood from the following detailed description of a specific embodiment thereof, taken in conjunction with the accompanying drawing which is a schematic longitudinal section view of a device for recovery of chlorine-containing compounds.

DESCRIPTION OF THE PREFERRED EMBODIMENT

Referring now to the drawing, the device comprises a chamber 1 for passage of waste gases and precipitation of solid particles A an inlet pipe 2 through which the chamber 1 communicates with a furnace, and an outlet pipe 3 through which the chamber 1 communicates with a smoke flue or a similar discharging device are provided. Fans 4 are 4 arranged opposite one another and create a turbulent gas flow, motors 5 drive the fans, special housings serve to guide the streams created by the fans and secured on the chamber 1, and seals 7 to preclude ingress of the atmospheric air into the chamber 1 of the device.

The proposed device operates as follows:

Waste gases together with solid particles are fed through the inlet pipe 2 into the chamber 1. The solid particles are captured by the first stream of the fans 4. Then, the solid particles are transferred from one stream to another, decelerated, accelerated in the opposite direction, and return to the original stream. Having undergone several such oscillations, the particles enter the area of capture by subsequent fans.

The process is intensified by increasing velocities and inertial effects, as well as by the turbulence of the flow and total increase in the time of residence of the particles in the active zone of the device. The recovered chlorine-containing compounds precipitate together with dust in the bottom portion of the chamber 1, and the cleaned waste gases leave the chamber 1 through the outlet pipe 3.

The present invention can most advantageously be used in all industries where dry processes of recovery of chlorine-containing compounds are used, for example, in the production of cement clinker.

What is claimed is:

1. A device for recovery of chlorine-containing compounds from waste gases, comprising:

an elongated substantially vertical chamber for passage of a flow of waste gases transporting solid particles in the flow and defining a gas flow path for said gases upwardly;

inlet and outlet pipes spaced axially on said chamber, for letting the waste gases in and out, adjacent the bottom and top of said chamber respectively;

driven fans arranged inside said chamber in pairs axially spaced along the gas flow path, opposite one another, their blades being arranged parallel to the flow of waste gases along said gas flow path through said chamber and driven simultaneously to develop opposed flow streams flowing opposite to each other and normal to the waste gas flow.

2. A device as claimed in claim 1, including housings wherein the fan blades are accommodated, said housings having an open end in communication with said chamber and serving as guides for said opposed flow streams created by the blades in a direction normal to the waste gas flow.

3. A device as claimed in claim 1, wherein the distance between the blades of each pair of fans is 1 to 8R, where R is the fan blade length.

4. A device for recovery of chlorine-containing compounds from waste gases comprising:

means defining an upstanding elongated chamber flow path for flowing upwardly therethrough a flow of waste gases having chlorine-containing compounds, means to introduce into the upwardly flowing flow in said chamber particles suspended in said flow as it flows upwardly for recovery of chlorine-containing compounds, driven fans axially spaced along the gas flow path in pairs opposite one another, said fans having blades arranged parallel to the flow of waste gases and driven simultaneously to develop at each pair of fans opposed flow streams flowing opposite to each other and normal to the waste gas flow, whereby turbulent gas flow at each pair of fans and the contact between the particles and waste gases is increased and the velocity of said particles in the waste gas flow is decreased sufficiently to preciptate the particles to the bottom of said chamber, and means defining an inlet and an outlet axially spaced for letting the gases in and out respectively.

5. A device for recovery of chlorine-containing compounds from waste gases according to claim 4, including for said fans, housings having an open end in communication with said chamber and functioning as guides for said opposed flow streams.

6. A device for recovery of chlorine-containing compounds from waste gases according to claim 5, in which each housing has an axis substantially normal to said flow path of said flow of waste gases.

* * * * *